United States Patent
Tsorng et al.

(10) Patent No.: US 12,050,357 B2
(45) Date of Patent: Jul. 30, 2024

(54) FIBER OPTIC DISTRIBUTION BOX

(71) Applicant: Quanta Computer Inc., Taoyuan (TW)

(72) Inventors: Yaw-Tzorng Tsorng, Taoyuan (TW);
Chen-Chien Kuo, Taoyuan (TW);
Tang-Shun-Lee Chen, Taoyuan (TW);
Bo-Sheng Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 123 days.

(21) Appl. No.: 17/655,709

(22) Filed: Mar. 21, 2022

(65) Prior Publication Data
US 2023/0204889 A1    Jun. 29, 2023

Related U.S. Application Data

(60) Provisional application No. 63/265,941, filed on Dec. 23, 2021.

(51) Int. Cl.
*G02B 6/00* (2006.01)
*G02B 6/44* (2006.01)

(52) U.S. Cl.
CPC .......... *G02B 6/445* (2013.01); *G02B 6/4452* (2013.01)

(58) Field of Classification Search
CPC .... G02B 6/445; G02B 6/4452; G02B 6/4446; G02B 6/00
See application file for complete search history.

(56) References Cited

U.S. PATENT DOCUMENTS

| | | | |
|---|---|---|---|
| 8,472,775 B2 | 6/2013 | Cobille et al. | |
| 2020/0400907 A1* | 12/2020 | Takeuchi | H04Q 1/13 |
| 2021/0011239 A1 | 1/2021 | Geens et al. | |
| 2022/0075137 A1* | 3/2022 | Womack | G02B 6/4482 |

FOREIGN PATENT DOCUMENTS

| | | | | |
|---|---|---|---|---|
| CN | 201828694 U | 5/2011 | | |
| CN | 102165351 A | 8/2011 | | |
| EP | 744640 A1 * | 11/1996 | ........... | G02B 6/4446 |
| TW | 202100439 A | 1/2021 | | |

OTHER PUBLICATIONS

TW Office Action for Application No. 111124009, mailed Feb. 2, 2023, w/ First Office Action Summary.
TW Search Report for Application No. 111124009, mailed Feb. 2, 2023, w/ First Office Action and list of location of references.
List of location of references cited in Search Report for TW Application No. 111124009, mailed Feb. 2, 2023, w/First Office Action and Search Report.

* cited by examiner

*Primary Examiner* — Jennifer Doan
(74) *Attorney, Agent, or Firm* — NIXON PEABODY LLP (57) ABSTRACT

A cable distribution box includes a base plate, a proximal wall extending from a first side of the base plate, a distal wall extending from a second side of the base plate, a latch formed on a third side of the base plate, and a cover plate extending from the proximal wall. The latch is configured to secure the cable distribution box to a chassis. The cover plate has a center portion that projects towards the base plate, such that the center portion is configured to wrap a cable thereon. The cover plate is foldable along a length of the proximal wall, relative to the base plate in a clamshell fashion, to enclose the wrapped cable between the cover plate and the base plate. The cover plate includes a locking mechanism that is configured to engage the distal wall, and secure the cover plate onto the base plate.

12 Claims, 7 Drawing Sheets

Step3: Slide box forward and take out the box from enclosure for maintenance

FIG. 4A

Step1: Unlock the optical fiber plug    Step2: Unlock the latch both side

FIBER OPTIC DISTRIBUTION BOX

CROSS-REFERENCE TO RELATED APPLICATIONS

This application claims priority from and benefit of U.S. Provisional Patent Application Ser. No. 63/265,941, filed on Dec. 23, 2021, titled "Foldable One Piece Optical Fiber Distribution Box," which is hereby incorporated by reference herein in its entirety.

FIELD OF THE INVENTION

The present invention relates generally to cable management, and more specifically, to a cable distribution box.

BACKGROUND OF THE INVENTION

A fiber optic distribution box is used to organize and distribute optical cables and the branches. As a terminate unit, the fiber optic distribution box allows to terminate cable elements, and provides a secure, organized chamber for housing connectors and splice units. Typically, multiple optical cables are wrapped together in the same fiber optic distribution box, thus it is often cumbersome to rearrange the optical cables. In addition, the box capacity to accommodate the optical cables is not scalable. The present disclosure is directed to solving these problems and addressing other needs.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a cable distribution box includes a base plate, a proximal wall extending from a first side of the base plate, a distal wall extending from a second side of the base plate, a latch formed on a third side of the base plate, and a cover plate extending from the proximal wall. The latch is configured to secure the cable distribution box to a chassis. The cover plate has a center portion that projects towards the base plate, such that the center portion is configured to wrap a cable thereon. The cover plate is foldable along a length of the proximal wall, relative to the base plate in a clamshell fashion, to enclose the wrapped cable between the cover plate and the base plate. The cover plate includes a locking mechanism that is configured to engage the distal wall, and secure the cover plate onto the base plate.

In some aspects, the locking mechanism of the cover plate includes a tab extending towards the base plate. The distal wall includes a corresponding depression or aperture configured to receive the tab. The tab is movable to engage or disengage all the cover plate relative to the base plate. In some aspects, the center portion of the cover plate is generally circular. In some aspects, the center portion of the cover plate includes a plurality of catches formed along a perimeter of the center portion. The plurality of catches is configured to hold the wrapped cable in place. In some aspects, the cable distribution box further includes another latch formed on the third side of the base plate.

In some aspects, the latch includes a first arm attached to the third side of the base plate, and a second arm hingeably coupled to the first arm such that the second arm operates to open and close the latch. In some such aspects, the first arm and the second arm form a through hole when the latch is closed.

In some aspects, the proximal wall includes two opposing ends in a longitudinal direction along the length of the proximal wall. A first end of the two opposing ends includes a protrusion configured to engage a corresponding aperture of a first adjacent cable distribution box, via an interference fit or a snap fit. A second end of the two opposing ends includes an aperture configured to engage a corresponding protrusion of a second adjacent cable distribution box, via an interference fit or a snap fit. In some such aspects, the first adjacent cable distribution box or the second adjacent cable distribution box is the same as the cable distribution box.

According to certain aspects of the present disclosure, a system includes a chassis, a pair of rods parallel to each other, and a cable distribution box. The chassis has a length, a width, and a height. The length and the width define a primary plane of the chassis. The height defines a Z-direction perpendicular to the primary plane. The cable distribution box has a cover plate hingedly molded with a base plate, and a pair of latches configured to secure the cable distribution box to the pair of rods. The cover plate is movable relative to the base plate between a secured position and an unsecured position. The cover plate includes a protruding portion that forms a supporting structure, for wrapping a cable when the cover plate is in the secured position relative to the base plate.

In some aspects, a distance between the pair of rods is the same as a distance between the pair of latches of the cable distribution box. In some aspects, the system further includes a plurality of the cable distribution boxes configured to be stacked to each other when secured to the pair of rods. In some such aspects, the pair of rods is coupled to the chassis and extends in the Z-direction perpendicular to the primary plane, such that the plurality of the cable distribution boxes is configured to be stacked on one other along the Z-direction.

In some aspects, the pair of rods is coupled to the chassis, and extends in a direction parallel to the primary plane. In some such aspects, a first rod of the pair of rods is positioned directly above a second rod of the pair of rods in the Z-direction. The first rod is positioned such that a proximal wall or a distal wall of the cable distribution box is configured to rest directly on a baseboard of the chassis, when secured to the pair of rods.

In some aspects, the system further includes a third rod coupled to the chassis, and extends in a direction parallel to the primary plane. A proximal wall or a distal wall of the cable distribution box is configured to rest against the third rod, when secured to the pair of rods.

According to certain aspects of the present disclosure, a system includes a plurality of cable distribution boxes. Each cable distribution box includes a base plate, a proximal wall extending from a first side of the base plate, a distal wall extending from a second side of the base plate, a latch formed on a third side of the base plate, and a cover plate extending from the proximal wall. The proximal wall includes a protrusion at a first end and an aperture at a second end. The latch is configured to secure the cable distribution box to a chassis. The cover plate has a center portion that is configured to wrap a cable thereon. The cover plate is foldable relative to the base plate, to enclose the wrapped cable within the cable distribution box. The cover plate includes a locking mechanism configured to engage the distal wall to secure the cover plate onto the base plate.

In some aspects, the aperture of the proximal wall of a first cable distribution box is configured to engage the protrusion of the proximal wall of a second cable distribution box, thereby attaching the first cable distribution box to the second cable distribution box. In some such aspects, the latch of the first cable distribution box is coupled to a same rod as the latch of a third cable distribution box, such that the base plate of the first cable distribution box is adjacent to the cover plate of the third cable distribution box.

In some aspects, the latch of a first cable distribution box is coupled to a same rod as the latch of a second cable distribution box, such that the base plate of the first cable distribution box is adjacent to the cover plate of the second cable distribution box.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 1:
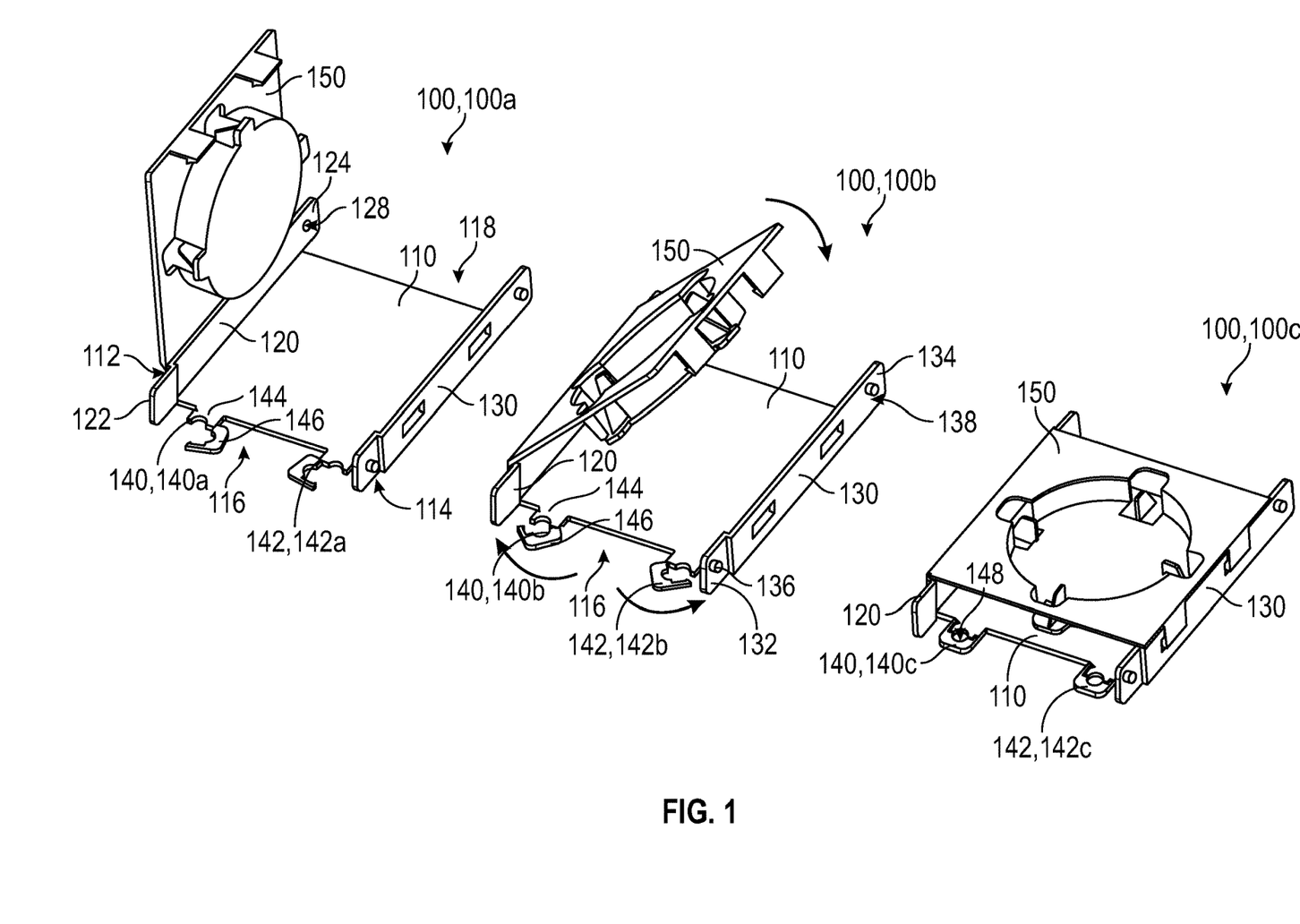
FIG. 1 illustrates a cable distribution box transitioning from being open to being closed, according to certain aspects of the present disclosure.

Referring to FIG. 1, a cable distribution box 100 is illustrated transitioning from being open to being closed, according to certain aspects of the present disclosure. Specifically, FIG. 1 illustrates the progression of the cable distribution box 100 from being open in a first orientation 100a, to being open in a second orientation 100b, to being closed in a third orientation 100c.

The cable distribution box 100 includes a base plate 110, a proximal wall 120, a distal wall 130, a pair of latches 140 and 142, and a cover plate 150 extending from the proximal wall 120. The base plate 110 has four sides: a first side 112, a second side 114 that is opposite to the first side 112, a third side 116, and a fourth side 118 that is opposite to the third side 116. The proximal wall 120 extends from a first side 112 of the base plate 110. The distal wall 130 extends from a second side 114 of the base plate 110. The pair of latches 140 and 142 is formed on the third side 116 of the base plate 110.

Figure 3:
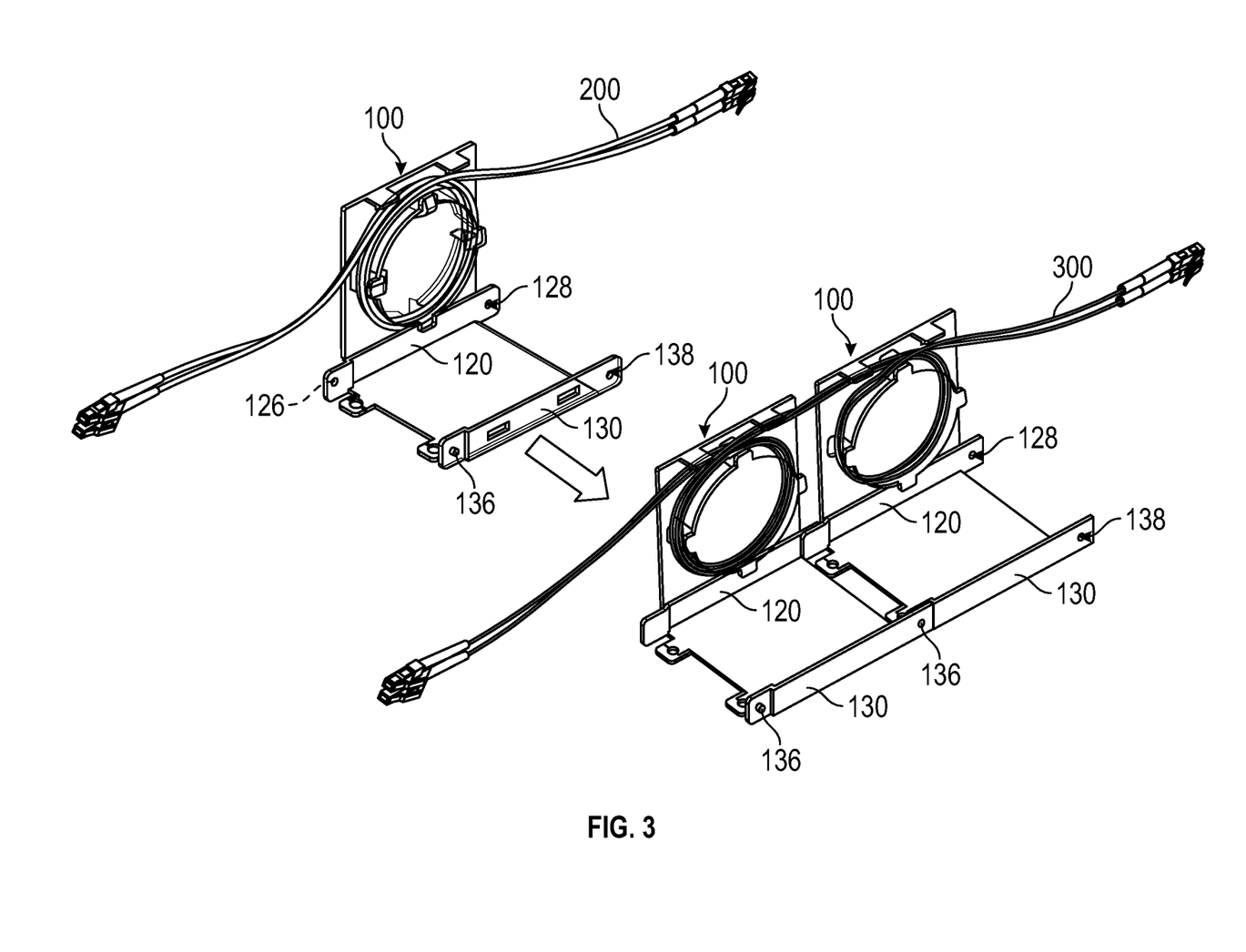
FIG. 3 illustrates connecting two cable distribution boxes, according to certain aspects of the present disclosure.

The proximal wall 120 includes two ends 122 and 124 opposing each other in a longitudinal direction along the length of the proximal wall 120. The first end 122 of the proximal wall 120 includes a protrusion 126 (FIG. 3). The second end 124 of the proximal wall 120 includes an aperture 128. In some implementations, the protrusion 126 of the proximal wall 120 is configured to engage a corresponding aperture 128 of an adjacent cable distribution box 100 via interference fit or snap fit, as shown in FIG. 3. Alternatively or additionally, the aperture 128 of the proximal wall 120 is configured to engage a corresponding protrusion 126 of an adjacent cable distribution box 100 via interference fit or snap fit.

Similarly, in some implementations, the distal wall 130 includes two ends 132 and 134 opposing each other in a longitudinal direction along the length of the distal wall 130. In some such implementations, the length of the distal wall 130 is the same as the length of the proximal wall 120. The first end 132 of the distal wall 130 includes a protrusion 136. The second end 134 of the distal wall 130 includes an aperture 138. In some implementations, the protrusion 136 of the distal wall 130 is configured to engage a corresponding aperture 138 of an adjacent cable distribution box 100 via interference fit or snap fit, as shown in FIG. 3. Alternatively or additionally, the aperture 138 of the distal wall 130 is configured to engage a corresponding protrusion 136 of an adjacent cable distribution box 100 via interference fit or snap fit.

Figure 4A:
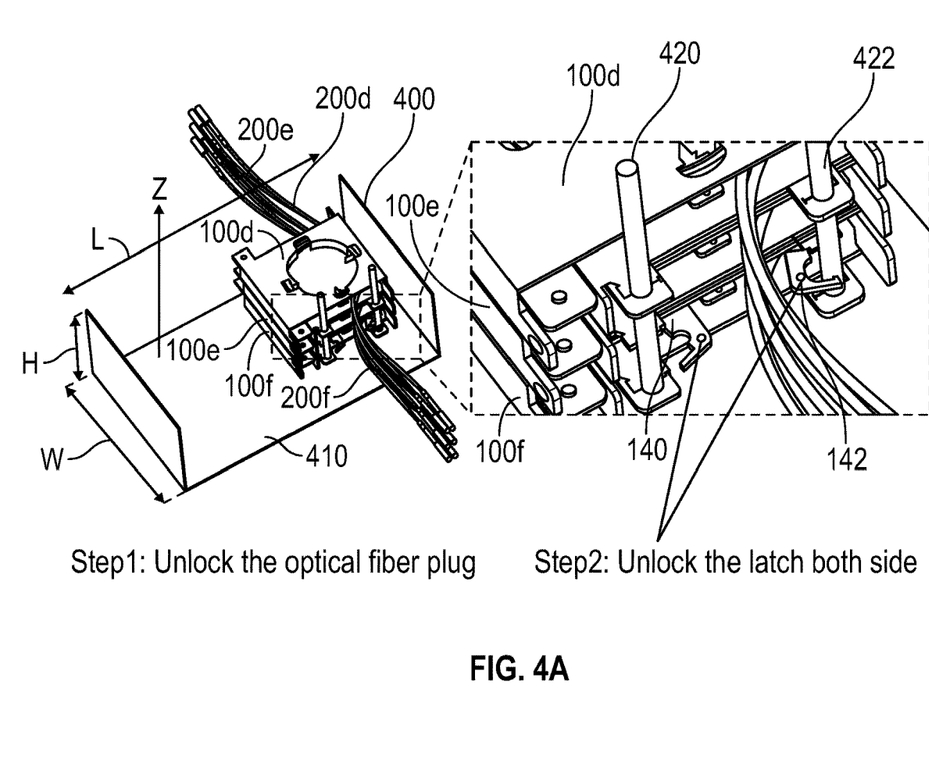
FIG. 4A illustrates a plurality of cable distribution boxes grouped together in a chassis in a first orientation, according to certain aspects of the present disclosure.

Each of latches 140 and 142 is configured to secure the cable distribution box 100 to a chassis 400 (FIG. 4A). The latch 140 includes a first arm 144 attached to the third side 116 of the base plate 110. The latch 140 further includes a second arm 146 hingeably coupled to the first arm 144, such that the second arm 146 operates to open and close the latch 140, in order to uncouple and couple the cable distribution box 100 to the chassis 400. In this example, the first arm 144 and the second arm 146 form a through hole 148 when the latch 140 is closed. As such, FIG. 1 illustrates also the progression of the latches 140 and 142 from being open in a first orientation 140a and 142a, to being open in a second orientation 140b and 142b, to being closed in a third orientation 140c and 142c. As shown in FIG. 1, the latch 142 is a mirror image of the latch 140, and thus opens in an opposition direction from the latch 140. In other examples, the latch 142 may be the same as the latch 140, and thus opens in the same direction as the latch 140.

Figure 2:
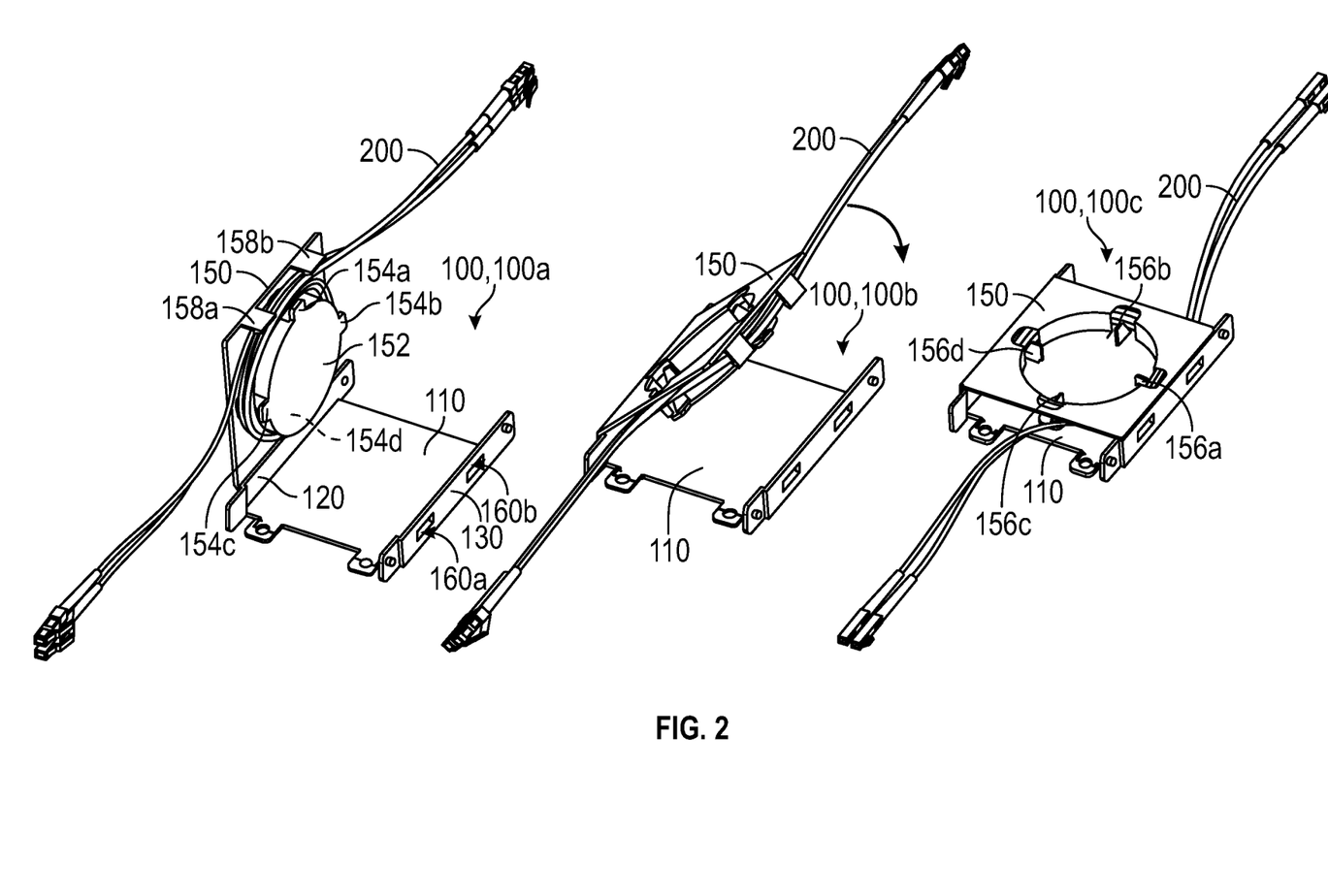
FIG. 2 illustrates the cable distribution box of FIG. 1 transitioning from being open to being closed, with a cable assembly wrapped therein, according to certain aspects of the present disclosure.

Referring to FIG. 2, the cable distribution box 100 is illustrated from being open to being closed, with a cable assembly 200 wrapped therein, according to certain aspects of the present disclosure. Similar to FIG. 1, FIG. 2 illustrates the progression of the cable distribution box 100 from being open in the first orientation 100a, to being open in the second orientation 100b, to being closed in the third orientation 100c. The cable distribution box 100 shown in FIG. 2 is the same as, or similar to, the cable distribution box 100 shown in FIG. 1, where identical reference numerals designate identical elements.

The cover plate 150 has a center portion 152 that projects towards the base plate 110, such that at least a portion of the cable assembly 200 is configured to be wrapped on the center portion 152. In this example, the center portion 152 of the cover plate 150 is generally circular, and includes four catches 154a, 154b, 154c, and 154d formed along a perimeter of the center portion 152. The catches 154a, 154b, 154c, and 154d are configured to hold the wrapped cable assembly 200 in place. The cover plate 150 also includes four corresponding catches 156a, 156b, 156c, and 156d formed on the underside of the center portion 152. The corresponding catches 156a, 156b, 156c, and 156d aid in further securing and/or protecting the wrapped cable assembly 200.

As shown in the progression of FIG. 2, the cover plate 150 is foldable along the length of the proximal wall 120, relative to the base plate 110, in a clamshell fashion, to enclose the wrapped cable assembly 200 within the cable distribution box 100 (between the cover plate 150 and the base plate 110). The cover plate 150 may also include a locking mechanism that is configured to engage the distal wall 130 to secure the cover plate 150 onto the base plate 110. In this example, the locking mechanism includes two tabs 158a and 158b extending towards the base plate 110, in the same direction as the projection of the center portion 152. The distal wall 130 includes two depressions or apertures 160a and 160b configured to receive the two corresponding tabs 158a and 158b. In some implementations, actuating the tabs 158a and 158b of the cover plate 150 allows the engagement and disengagement of the cover plate 150 relative to the base plate 110.

In some implementations, some or all components of the cable distribution box 100 are molded from the same cavity, and are integral with one another. As such, all the key components may be linked together and provided with a single part number for the cable distribution box 100. This can help simplify the supply chain workflow, such as manufacturing, packaging, inventory management, assembly, and shipment.

In some implementations, the cable distribution box 100 is a fiber optic distribution box, and the cable assembly 200 is an optical fiber assembly. In other implementations, the cable distribution box 100 can be any distribution box that houses cables or cable assemblies for use in a computing or electronic system, such as the example show in FIG. 7.

Referring to FIG. 3, the connection of two cable distribution boxes 100 is illustrated, according to certain aspects of the present disclosure. As described above, the protrusion 126 of the proximal wall 120 is configured to snap to the corresponding aperture 128 of the adjacent cable distribution box 100. Similarly, the protrusion 136 of the distal wall 130 is configured to snap to the corresponding aperture 138 of the adjacent cable distribution box 100. As such, the capacity for holding any cable assembly is scalable by the coupling of two or more cable distribution boxes 100 together. In other words, the cable distribution boxes 100 are able to join together to extend the overall capacity for holding a cable assembly 300 that may be too long or too bulky for a single cable distribution box 100.

Referring to FIG. 4A, three cable distribution boxes 100d, 100e, and 100f are grouped together in the chassis 400 in a first orientation, according to certain aspects of the present disclosure. Each of the cable distribution boxes 100d, 100e, and 100f shown in FIG. 4A is the same as, or similar to, the cable distribution box 100 shown in FIGS. 1-3, where like reference numerals designate identical or similar elements. The cable assembly 200d is partially wrapped within the cable distribution box 100d. The cable assembly 200e is partially wrapped within the cable distribution box 100e. The cable assembly 200f is partially wrapped within the cable distribution box 100f.

The chassis 400 has a length L, a width W, and a height H. The length L and the width W define a primary plane of the chassis 400. The height H defines a Z-direction perpendicular to the primary plane. In some implementations, the primary plane coincides with the baseboard 410 of the chassis 400. A pair of rods 420 and 422 extend in the Z-direction from the baseboard 410, and are parallel to each other.

As described earlier, the latches 140 and 142 (FIG. 1) of each of the cable distribution boxes 100d, 100e, and 100f are configured to secure the cable distribution box to the chassis 400. Specifically, in this example, each of the cable distribution boxes 100d, 100e, and 100f is secured to the pair of rods 420 and 422. In some implementations, the distance between the pair of rods 420 and 422 is the same as that between the pair of latches of the cable distribution box 100d, 100e, or 100f (measured between the corresponding through hole 148 (FIG. 1) for each latch).

Because the pair of rods 420 and 422 is coupled to the chassis 400 and extends in the Z-direction, the cable distribution boxes 100d, 100e, and 100f are stacked on one other along the Z-direction, when secured to the pair of rods 420 and 422. The replacement or maintenance of one of the cable assemblies is then easy and does not interfere with the remaining cable assemblies.

Figure 4B:
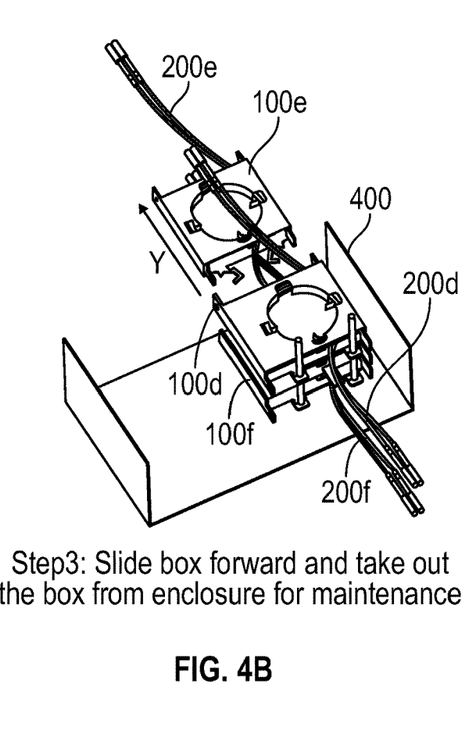
FIG. 4B illustrates the removal or displacement of a cable distribution box from the plurality of cable distribution boxes of FIG. 4A, according to certain aspects of the present disclosure.

For example, to maintain the cable assembly 200e wrapped partially within the cable distribution box 100e, the cable assembly 200e is first unplugged from its connection, while the remaining cable assemblies 200d and 200f can remain plugged to their corresponding connections. The pair of latches 140 and 142 of the cable distribution box 100e is actuated to an open orientation. As shown in FIG. 4B, the cable distribution box 100e can then be removed from the chassis 400 in the Y-direction, without interfering with the cable assemblies 200d and 200f that are wrapped partially within the cable distribution boxes 100d and 100f, respectively.

Figure 5:
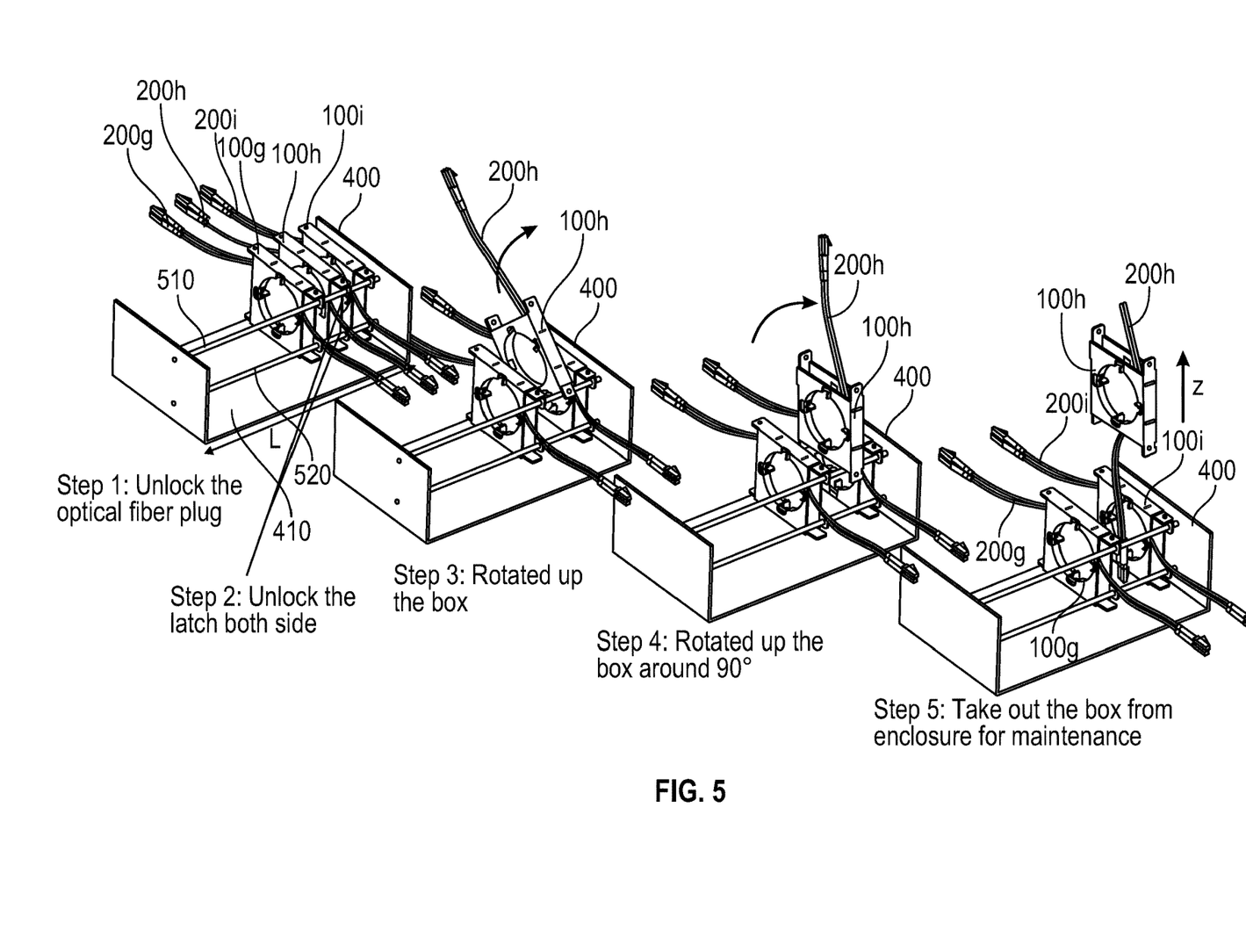
FIG. 5 illustrates the removal or displacement of a cable distribution box from a plurality of cable distribution boxes grouped together in a chassis in a second orientation, according to certain aspects of the present disclosure.

Referring to FIG. 5, three cable distribution boxes 100g, 100h, and 100i are grouped together in the chassis 400 in a second orientation, according to certain aspects of the present disclosure. Each of the cable distribution boxes 100g, 100h, and 100i shown in FIG. 5 is the same as, or similar to, the cable distribution box 100 shown in FIGS. 1-3, where like reference numerals designate identical or similar elements. The cable assembly 200g is partially wrapped within the cable distribution box 100g. The cable assembly 200h is partially wrapped within the cable distribution box 100h. The cable assembly 200i is partially wrapped within the cable distribution box 100i.

In this example, two rods 510 and 520 are coupled to the chassis 400, and extend in a direction parallel to the primary plane, which is also along the length L of the chassis 400. The cable distribution boxes 100g, 100h, and 100i may be secured to the chassis 400 via the two rods 510 and 520, in a similar manner as the cable distribution boxes 100d, 100e, and 100f as described relative to FIG. 4A. The first rod 510 is positioned directly above the second rod 520 in the Z-direction. As such, when secured to the two rods 510 and 520, the proximal wall 120 (FIG. 1) or the distal wall 130 (FIG. 1) of each of the cable distribution boxes 100g, 100h, and 100i rests directly on the baseboard 410 of the chassis 400. As shown in FIG. 5, when secured to the two rods 510 and 520, the proximal wall 120 (FIG. 1) of the cable distribution box 100g rests directly on the baseboard 410 of the chassis 400.

The replacement or maintenance of one of the cable assemblies is then easy and does not interfere with the remaining cable assemblies. For example, to maintain the cable assembly 200h wrapped partially within the cable distribution box 100h, the cable assembly 200h is first unplugged from its connection, while the remaining cable assemblies 200g and 200i can remain plugged to their corresponding connections. In order to remove the cable distribution box 100h from the chassis 400, the latch 140 or 142 (FIG. 1) that is closer to the baseboard 410 is unlocked to an open position from the second rod 520, so that the cable distribution box 100h can be rotated upwards while the remaining latch 142 or 140 is still locked to the first rod 510.

After the cable distribution box 100h is rotated upwards, the remaining latch 142 or 140 is unlocked to an open position from the first rod 510. The cable distribution box 100h can therefore be removed from the chassis 400 in the Z-direction, without interfering with the cable assemblies 200g and 200i that are wrapped partially within the cable distribution boxes 100g and 100i, respectively.

Figure 6:
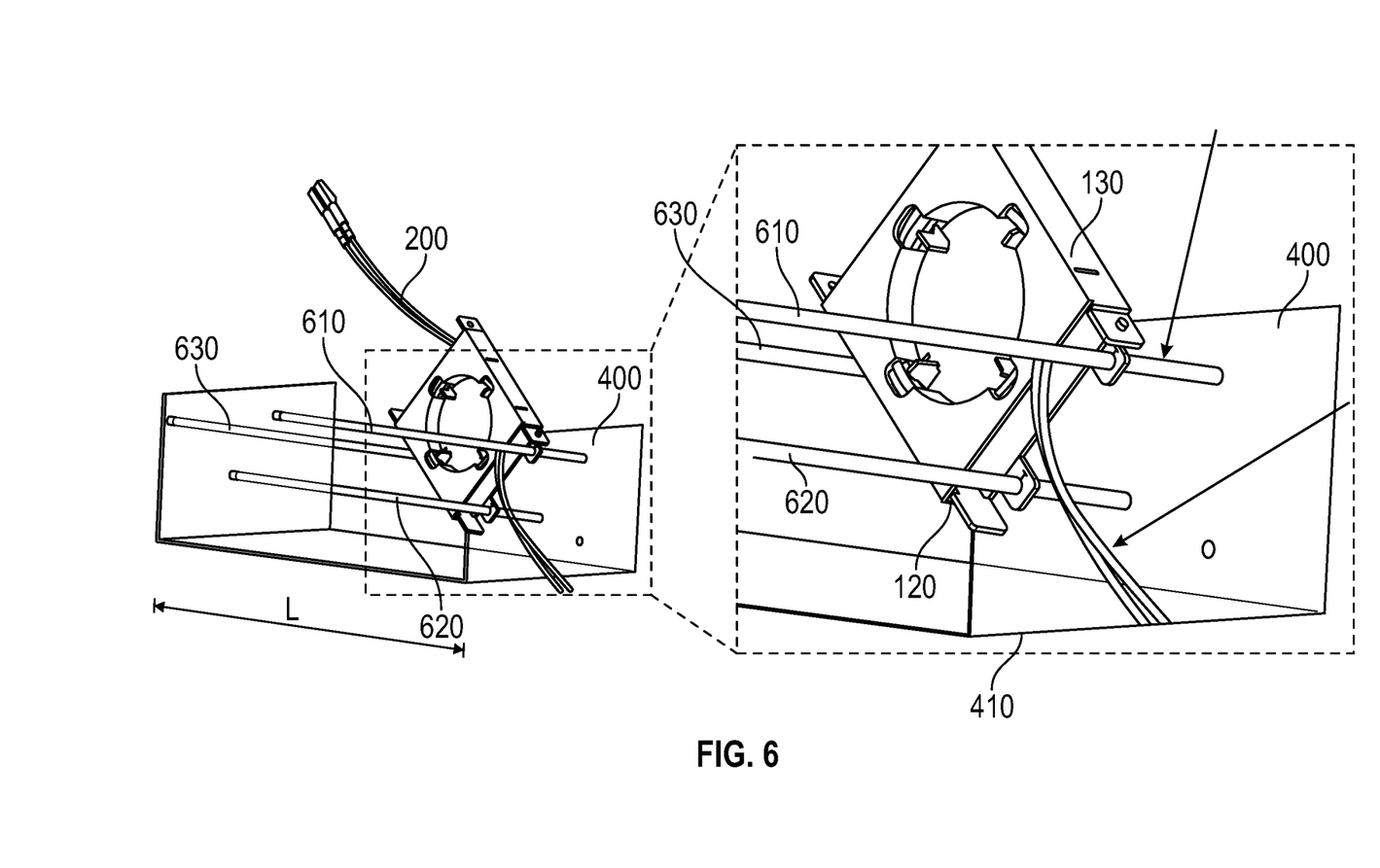
FIG. 6 illustrates the cable distribution box of FIG. 1 in a chassis in a third orientation, according to certain aspects of the present disclosure.

Referring to FIG. 6, the cable distribution box 100 is installed in the chassis 400 in a third orientation, according to certain aspects of the present disclosure. The third orientation shown in FIG. 6 is similar to the second orientation shown in FIG. 5, except that the upright placement of the cable distribution box 100 is not limited 0 degrees between the proximal wall 120 of the cable distribution box 100 and the baseboard 410 of the chassis 400. Instead, the cable distribution box 100 can be mounted at any angle based on the design requirement, such as based on optimal cable routing.

In this example, three rods 610, 620, and 630 are coupled to the chassis 400, and extend in a direction parallel to the primary plane, which is also along the length L of the chassis 400. The cable distribution box 100 may be secured to the chassis 400 via the rods 610 and 620, in a similar manner as the cable distribution boxes 100d, 100e, and 100f as described relative to FIG. 4A. The proximal wall 120 or the distal wall 130 of the cable distribution box 100 is configured to rest against the third rod 630, when secured to the pair of rods 610 and 620. As shown in FIG. 6, the proximal wall 120 of the cable distribution box 100 rests against the third rod 630. In other words, the third rod 630 helps keep the cable distribution box 100 angled relative to the baseboard 410 of the chassis 400. In some implementations, this third orientation shown in FIG. 6 provides a larger cable bending radius than that does the second orientation shown in FIG. 5, and thus prevents damage to the cable assembly 200.

Figure 7:
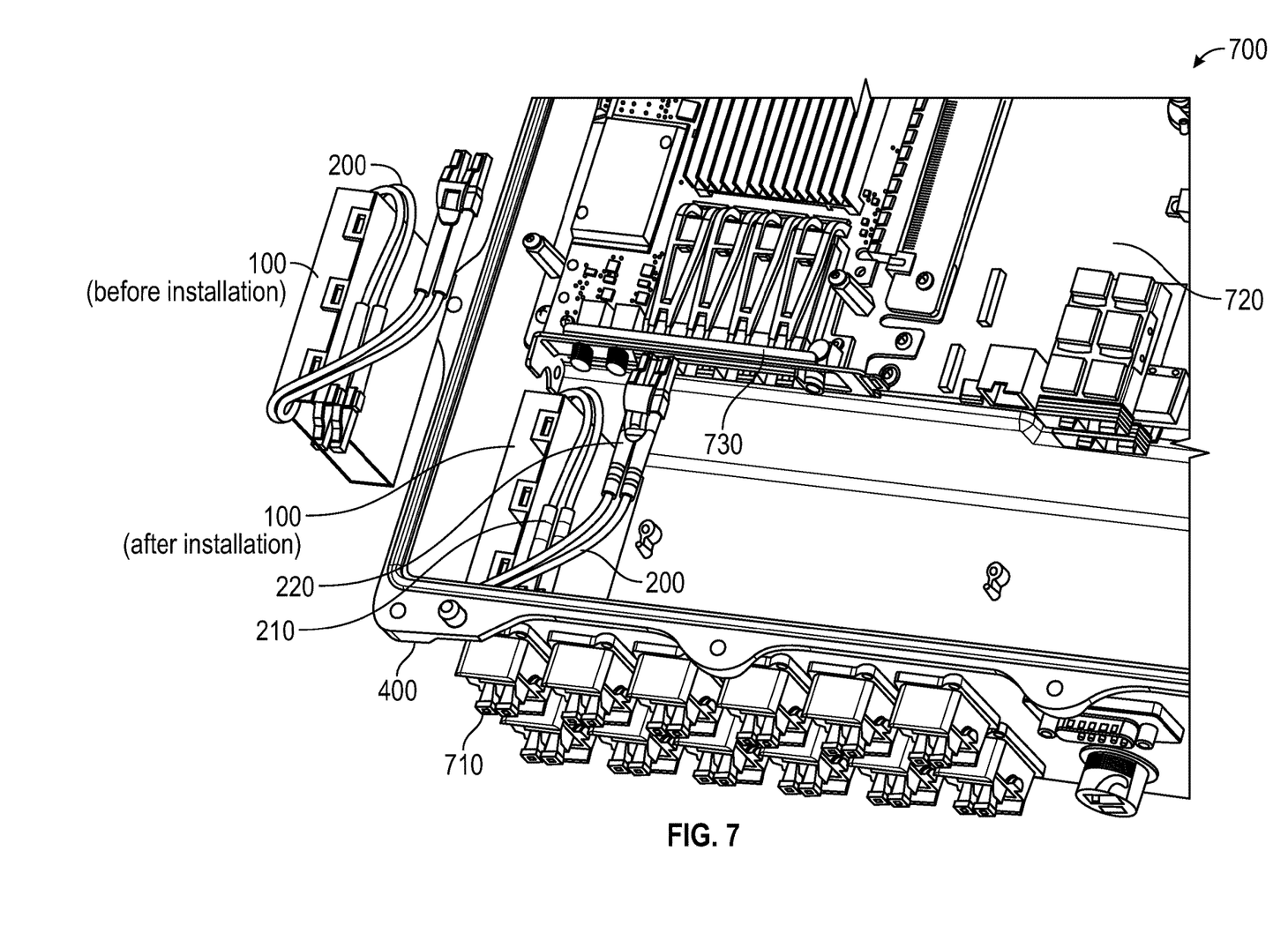
FIG. 7 illustrates installing a cable distribution box in a system, according to certain aspects of the present disclosure.

Referring to FIG. 7, the installation of the cable distribution box 100 in a system 700 is illustrated, according to certain aspects of the present disclosure. The cable assembly 200 is partially wrapped within the cable distribution box 100. After installation of the cable distribution box 100 within the chassis 400, one end 210 of the cable assembly 200 can connect to the front I/O connector 710 of the system 700, and the other end 220 of the cable assembly 200 can connect to the motherboard 720 of the system 700 via the corresponding connector 730. As such, the cable assembly 200 is a standalone structure that is protected by the cable distribution box 100, and is not interfered by other cable assemblies that may also be placed within the system 700.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A cable distribution box comprising:
a base plate;
a proximal wall extending from a first side of the base plate;
a distal wall extending from a second side of the base plate;
a latch formed on a third side of the base plate and configured to secure the cable distribution box to a chassis; and
a cover plate extending from the proximal wall and having a center portion that projects towards the base plate such that the center portion is configured to wrap a cable thereon, the cover plate being foldable along a length of the proximal wall relative to the base plate in a clamshell fashion to enclose the wrapped cable between the cover plate and the base plate, the cover plate including a locking mechanism configured to engage the distal wall and secure the cover plate onto the base plate;
wherein the latch includes a first arm attached to the third side of the base plate, and a second arm hingeably coupled to the first arm such that the second arm operates to open and close the latch.

2. The cable distribution box of claim 1, wherein the locking mechanism of the cover plate includes a tab extending towards the base plate, the distal wall including a corresponding depression or aperture configured to receive the tab, the tab being movable to engage or disengage all the cover plate relative to the base plate.

3. The cable distribution box of claim 1, wherein the center portion of the cover plate is generally circular.

4. The cable distribution box of claim 1, wherein the center portion of the cover plate includes a plurality of catches formed along a perimeter of the center portion, the plurality of catches being configured to hold the wrapped cable in place.

5. The cable distribution box of claim 1, further comprising another latch formed on the third side of the base plate.

6. The cable distribution box of claim 1, wherein the first arm and the second arm form a through hole when the latch is closed.

7. The cable distribution box of claim 1, wherein the proximal wall includes two opposing ends in a longitudinal direction along the length of the proximal wall, a first end of the two opposing ends including a protrusion configured to engage a corresponding aperture of a first adjacent cable distribution box via an interference fit or a snap fit, a second end of the two opposing ends including an aperture configured to engage a corresponding protrusion of a second adjacent cable distribution box via an interference fit or a snap fit.

8. The cable distribution box of claim 7, wherein the first adjacent cable distribution box or the second adjacent cable distribution box is the same as the cable distribution box.

9. A system comprising:
a plurality of cable distribution boxes, each cable distribution box including:
a base plate;
a proximal wall extending from a first side of the base plate, and including a protrusion at a first end and an aperture at a second end;
a distal wall extending from a second side of the base plate;
a latch formed on a third side of the base plate and configured to secure the cable distribution box to a chassis; and
a cover plate extending from the proximal wall and having a center portion that is configured to wrap a cable thereon, the cover plate being foldable relative to the base plate to enclose the wrapped cable within the cable distribution box, the cover plate including a locking mechanism configured to engage the distal wall to secure the cover plate onto the base plate.

10. The system of claim 9, wherein the aperture of the proximal wall of a first cable distribution box is configured to engage the protrusion of the proximal wall of a second cable distribution box, thereby attaching the first cable distribution box to the second cable distribution box.

11. The system of claim 10, wherein the latch of the first cable distribution box is coupled to a same rod as the latch of a third cable distribution box such that the base plate of the first cable distribution box is adjacent to the cover plate of the third cable distribution box.

12. The system of claim 9, wherein the latch of a first cable distribution box is coupled to a same rod as the latch of a second cable distribution box such that the base plate of the first cable distribution box is adjacent to the cover plate of the second cable distribution box.

* * * * *